(12) United States Patent
Ito et al.

(10) Patent No.: US 9,295,141 B2
(45) Date of Patent: Mar. 22, 2016

(54) IDENTIFICATION DEVICE, METHOD AND COMPUTER PROGRAM PRODUCT

(71) Applicant: KABUSHIKI KAISHA TOSHIBA, Minato-ku, Tokyo (JP)

(72) Inventors: Satoshi Ito, Kanagawa (JP); Kenichi Shimoyama, Tokyo (JP); Akihito Seki, Kanagawa (JP); Yuta Itoh, Kanagawa (JP); Masaki Yamazaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 205 days.

(21) Appl. No.: 14/013,526

(22) Filed: Aug. 29, 2013

(65) Prior Publication Data

US 2014/0111097 A1    Apr. 24, 2014

(30) Foreign Application Priority Data

Oct. 19, 2012   (JP) ................................. 2012-231669

(51) Int. Cl.
| | | |
|---|---|---|
| *H05B 37/02* | (2006.01) | |
| *H04N 5/232* | (2006.01) | |
| *H04N 5/222* | (2006.01) | |
| *H04N 5/225* | (2006.01) | |

(52) U.S. Cl.
CPC ........... *H05B 37/0245* (2013.01); *H04N 5/222* (2013.01); *H04N 5/2256* (2013.01); *H04N 5/232* (2013.01); *H05B 37/029* (2013.01)

(58) Field of Classification Search
CPC ........... H05B 37/0245; H05B 37/0254; H05B 37/0209; H05B 37/0272; H05B 37/029; H04N 5/222; H04N 5/2256; H04N 5/232
See application file for complete search history.

(56) References Cited

U.S. PATENT DOCUMENTS

2012/0319596 A1*  12/2012  Nanahara et al. .............. 315/153

FOREIGN PATENT DOCUMENTS

| JP | 2002-289373 | * 10/2002 |
|---|---|---|
| JP | 2009-283183 | *  3/2009 |
| JP | 2009-283183 |   12/2009 |

* cited by examiner

*Primary Examiner* — Jung Kim
(74) *Attorney, Agent, or Firm* — Amin, Turocy & Watson, LLP

(57) ABSTRACT

According to an embodiment, an identification device includes a controller, an acquiring unit, and an identifying unit. The controller controls turning on/off of a plurality of light emitting apparatuses via a network individually by using pieces of identification information of their respective light emitting apparatuses. The acquiring unit acquires images of the light emitting apparatuses in time-series. The identifying unit determines an installation position of each of the light emitting apparatuses by using the on/off control on the light emitting apparatuses and the images, and identifies each of the light emitting apparatuses determined by the installation positions corresponding to each of the light emitting apparatuses identified by the pieces of identification information with each other.

13 Claims, 8 Drawing Sheets

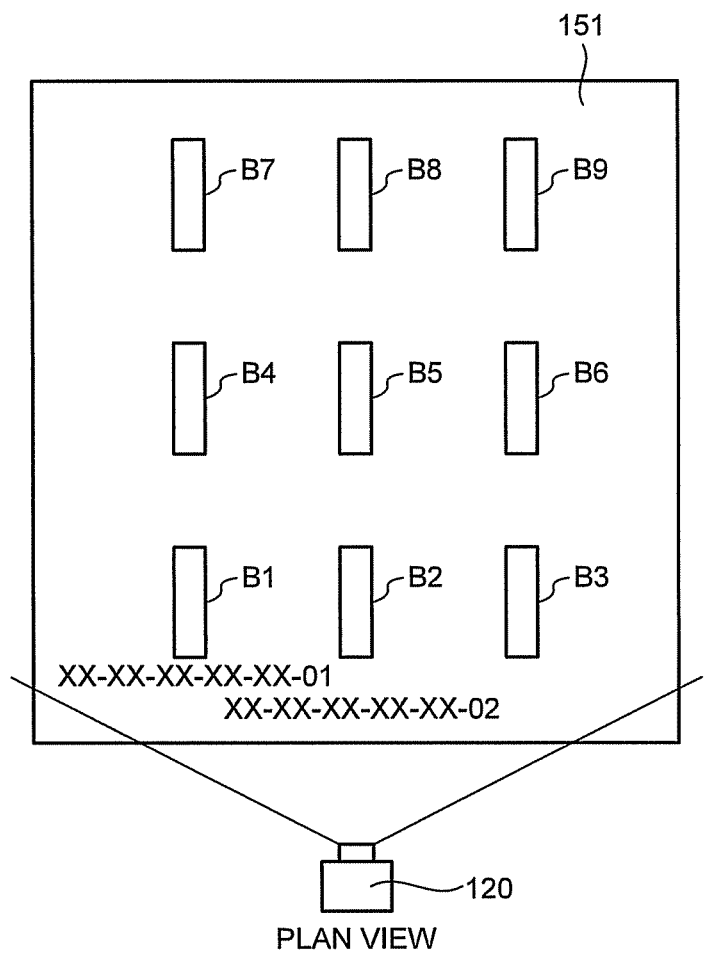

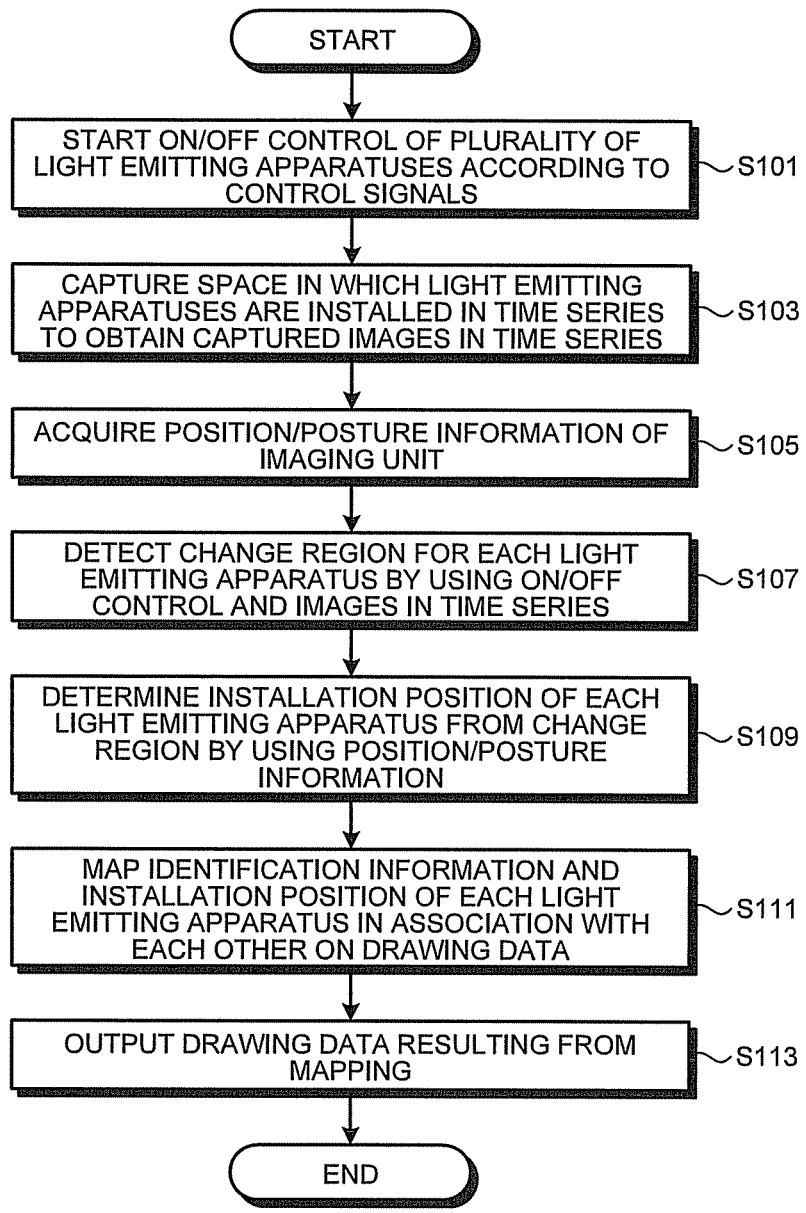

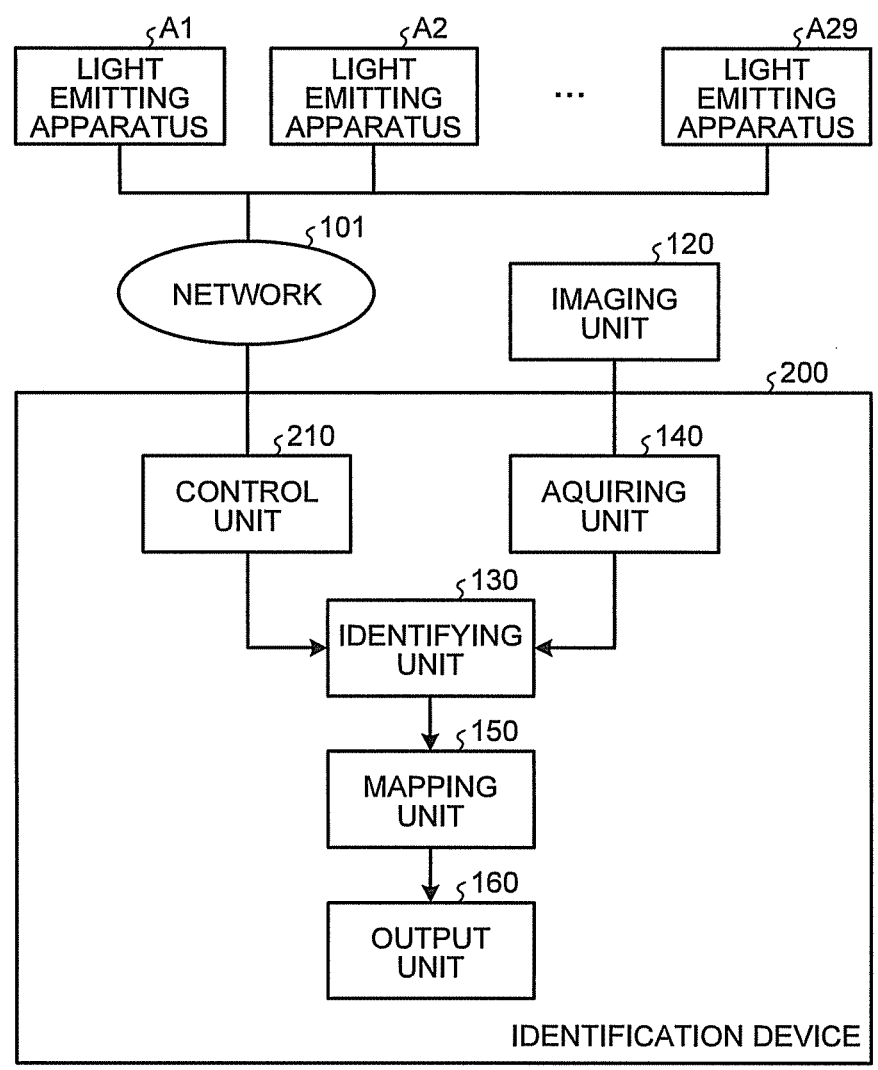

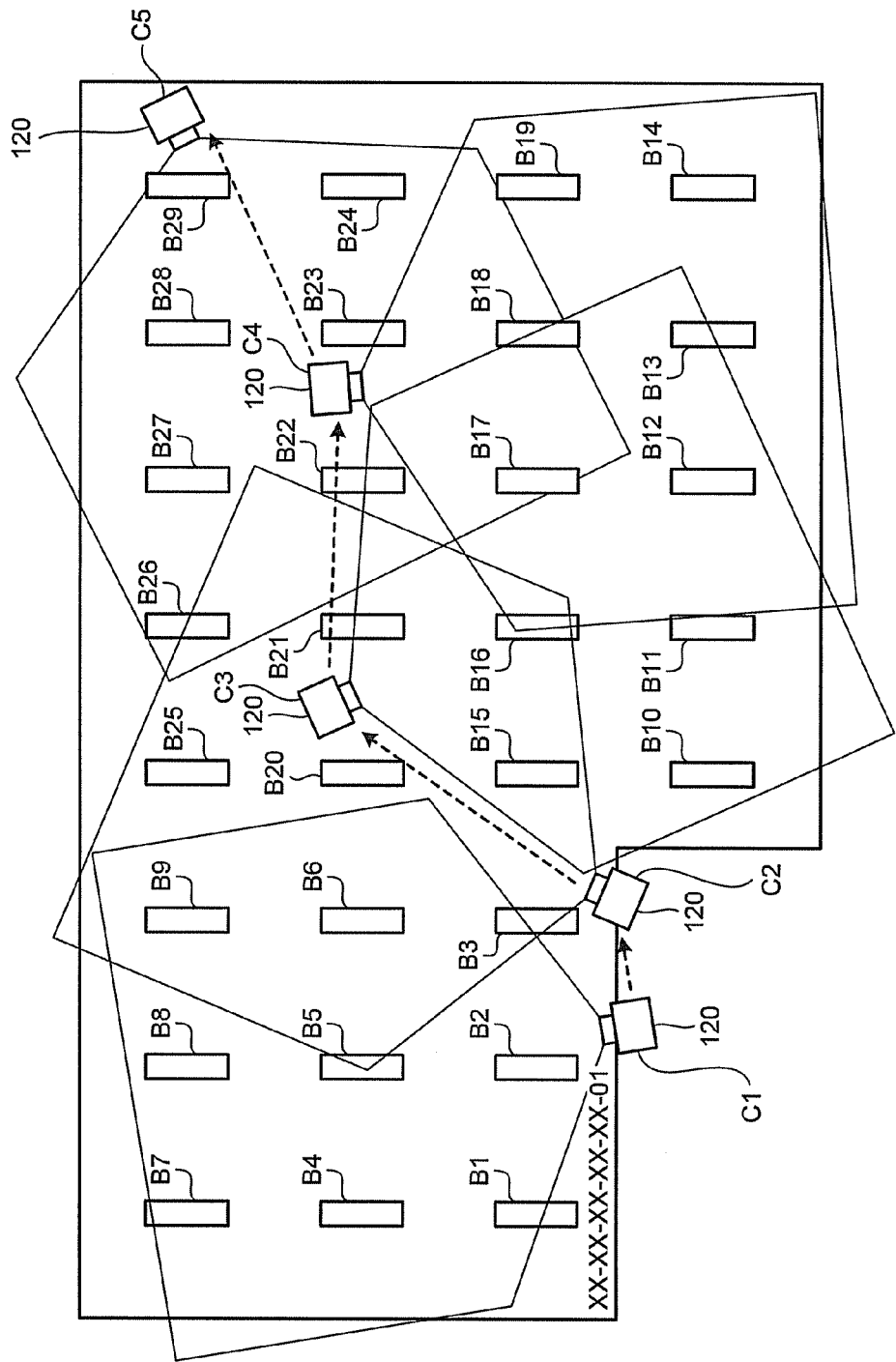

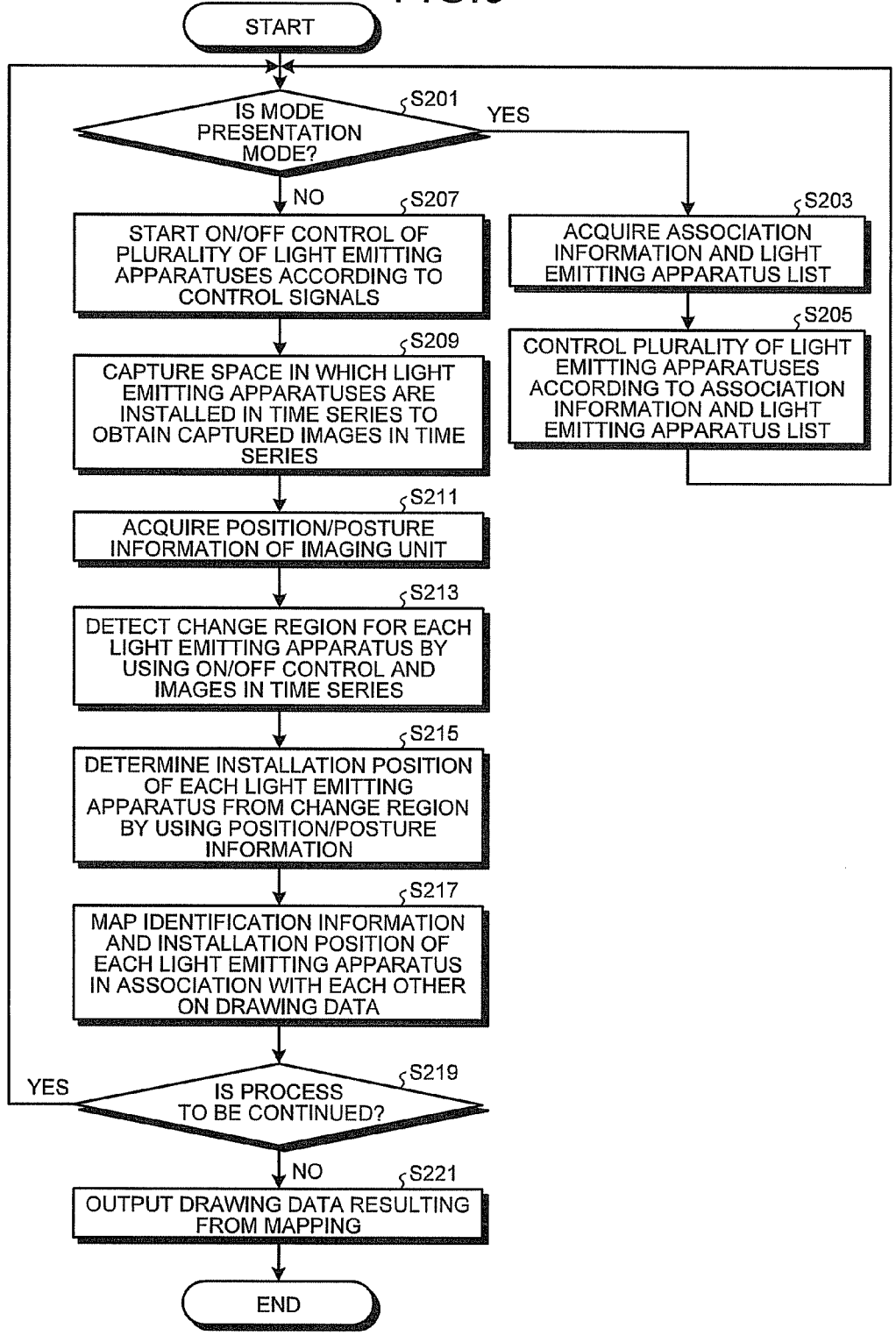

IDENTIFICATION DEVICE, METHOD AND COMPUTER PROGRAM PRODUCT

CROSS-REFERENCE TO RELATED APPLICATIONS

This application is based upon and claims the benefit of priority from Japanese Patent Application No. 2012-231669, filed on Oct. 19, 2012; the entire contents of which are incorporated herein by reference.

FIELD

Embodiments described herein relate generally to an identification device, a method therefor and a computer program product.

BACKGROUND

In recent years, some light emitting apparatuses such as lighting equipment installed in an office or the like that can be connected to a network are known. Accordingly, on/off control of light emitting apparatuses can be performed via the network by using identification information such as MAC (media access control) addresses and IP (Internet protocol) addresses of the light emitting apparatuses.

At a stage at which the light emitting apparatuses are installed in an office or the like by wiring the light emitting apparatuses, the identification information of the light emitting apparatuses is not usually considered. Thus, there may occur a situation in which association between the installation positions and the pieces of identification information is unclear, and in this state, it is impossible to perform the on/off control of the light emitting apparatuses according to the installation positions including determining the light emitting apparatuses subjected to the on/off control from the installation positions and performing on/off control of the light emitting apparatuses by using the identification information of the determined light emitting apparatuses.

In the meantime, there is a technique of calculating coordinates of the respective lighting equipment by using two imaging devices arranged to capture a space in which a plurality of pieces of lighting equipment is installed from directions perpendicular to each other and identifying the pieces of lighting equipment determined by the installation positions and the light emitting apparatuses identified by the pieces of identification information with each other.

With the technique of the related art as described above, however, the operation for arranging the imaging devices is troublesome, and the operation for identifying the light emitting apparatuses determined by the installation positions and the light emitting apparatuses identified by the pieces of identification information is also troublesome.

BRIEF DESCRIPTION OF THE DRAWINGS

FIG. 5 is a view illustrating an example of a mapping result according to the first embodiment;

FIG. 6 is a flowchart illustrating an example of an identification process according to the first embodiment;

FIG. 7 is a diagram illustrating an exemplary configuration of an identification device according to a second embodiment;

FIG. 8 is a view illustrating an example of a mapping result according to the second embodiment; and FIG. 9 is a flowchart illustrating an example of an identification process according to the second embodiment.

DETAILED DESCRIPTION

According to an embodiment, an identification device includes a controller, an acquiring unit, and an identifying unit. The controller controls turning on/off of a plurality of light emitting apparatuses via a network individually by using pieces of identification information of their respective light emitting apparatuses. The acquiring unit acquire images of the light emitting apparatuses in time-series. The identifying unit determines an installation position of each of the light emitting apparatuses by using the on/off control on the light emitting apparatuses and the images, and identifies each of the light emitting apparatuses determined by the installation positions corresponding to each of the light emitting apparatuses identified by the pieces of identification information with each other.

Various embodiments will be described below in detail with reference to the accompanying drawings.

First Embodiment

Figure 1:
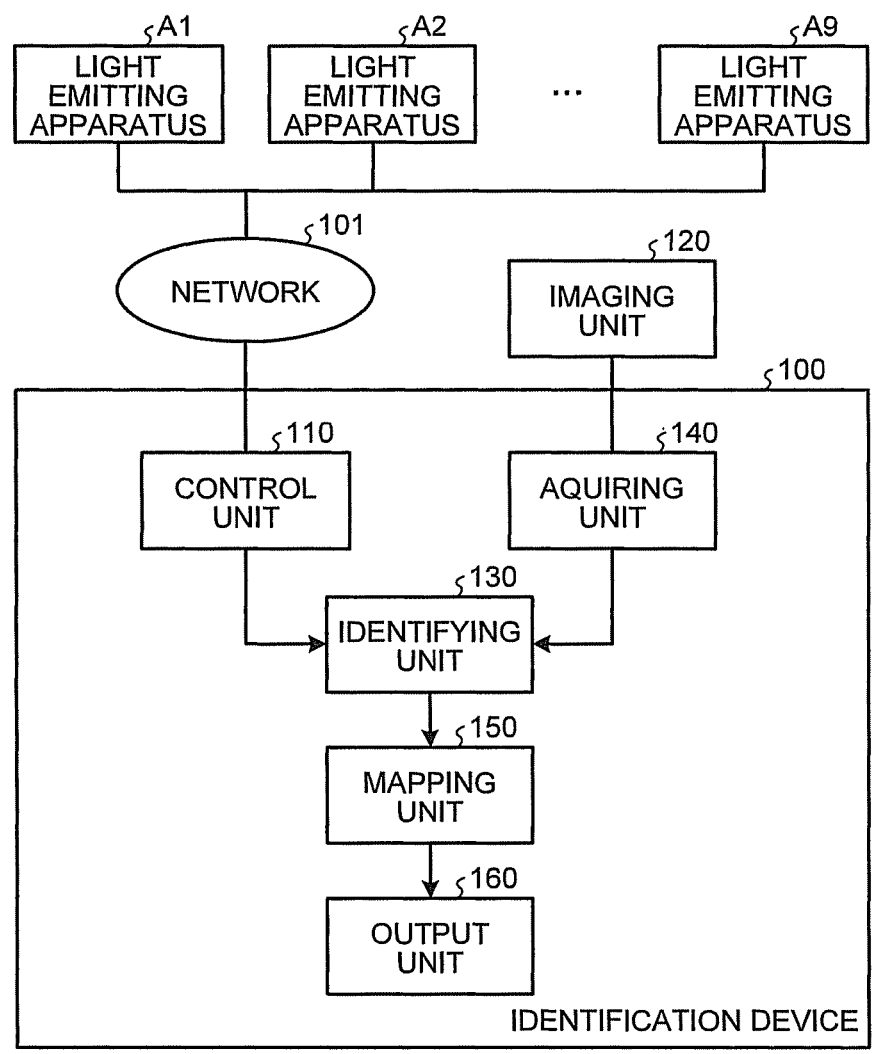
FIG. 1 is a diagram illustrating an exemplary configuration of an identification device according to a first embodiment.

FIG. 1 is a diagram illustrating an example of a configuration of an identification device 100 according to a first embodiment. As illustrated in FIG. 1, the identification device 100 includes a control unit 110, an acquiring unit 140, an identifying unit 130, a mapping unit 150 and an output unit 160. The identification device 100 (control unit 110) is connected with a plurality of light emitting apparatuses A1 to A9 via a network 101. An imaging unit 120 is captured a space of setting light emitting apparatuses.

Figure 2:
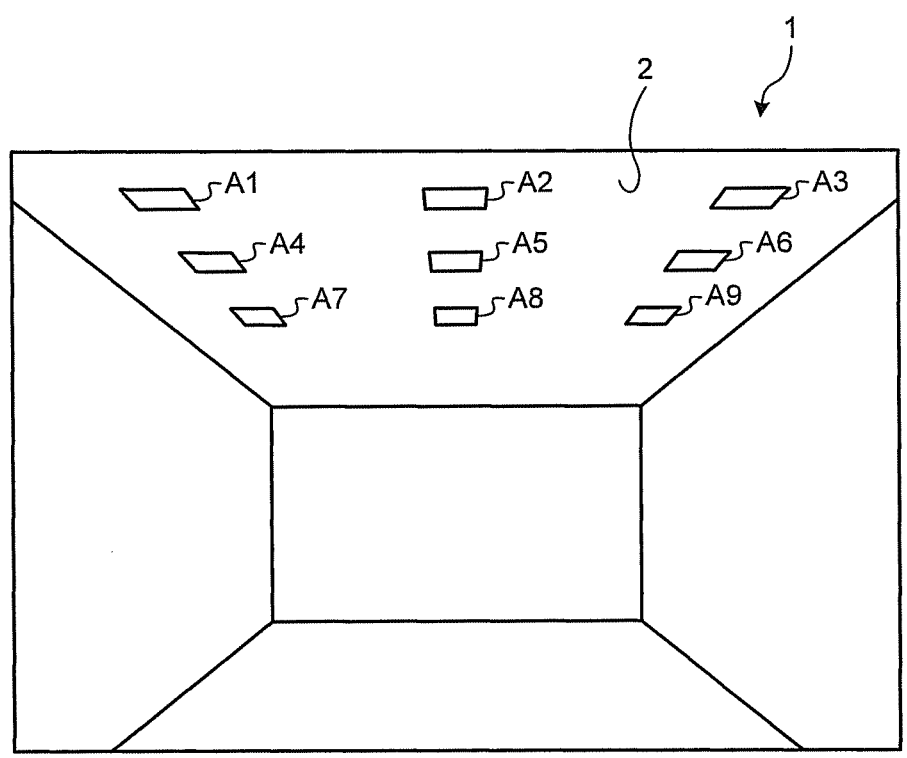
FIG. 2 is a perspective view illustrating an example of a space to which the identification device according to the first embodiment is applied.

FIG. 2 is a perspective view illustrating an example of a space 1 to which the identification device 100 according to the first embodiment is applied. As illustrated in FIG. 2, the light emitting apparatuses A1 to A9 are installed in a grid-like pattern on a ceiling 2 of the space 1. Although a case in which the space 1 is a space in an office is assumed, the space 1 is not limited thereto and may be any space in which light emitting apparatuses are arranged. The number of light emitting apparatuses may be any number more than one.

The light emitting apparatuses A1 to A9 will be described here. Note that the light emitting apparatuses A1 to A9 may simply be referred to as light emitting apparatuses A in the following description when the apparatuses need not be distinguished from one another.

Although a case in which the light emitting apparatuses A are lighting equipment having a light emitting function as a main function is assumed, the light emitting apparatuses A are not limited thereto. The light emitting apparatuses A may be any apparatuses having a light emitting function, and the light emitting function need not necessarily be the main function thereof.

The light emitting apparatuses A may be apparatuses, such as air conditioners, surveillance cameras, motion sensors, temperature sensors, and humidity sensors, having lamps or LEDs for allowing the operation states of the apparatuses to be checked by visual observation.

The light emitting apparatuses A1 to A9 need not be light emitting apparatuses of a single type but may be a combination of a plurality of types of light emitting apparatuses.

Specifically, all of the light emitting apparatuses A1 to A9 need not be lighting equipment, air conditioners, surveillance cameras, motion sensors, temperature sensors, or humidity sensors, but may be a combination of lighting equipment, air conditioners, and motion sensors, or may be other combinations.

The light emitting apparatuses A each have identification information such as an MAC address or an IP address, and on/off control via the network 101, that is, on/off control of the light emitting functions via the network 101 is possible by using the identification information.

Accordingly, the identification device 100 (control unit 110) can flexibly control turning on/off of the light emitting apparatuses A such as bringing some of the light emitting apparatuses A1 to A9 into the ON state and the others into the OFF state or repeating turning on and off of some of the light emitting apparatuses by using the identification information of the light emitting apparatuses A1 to A9.

Although a case in which the identification information of the light emitting apparatuses A is MAC addresses is assumed in the first embodiment, the identification information is not limited thereto and may be any identification information, such as IP addresses, used for network control.

Referring back to FIG. 1, the description will be made on the respective components of the identification device 100.

The control unit 110, the identifying unit 130, the acquiring unit 140 and the mapping unit 150 may be implemented by making a processor such as a central processing unit (CPU) execute programs, that is, by software, may be implemented by hardware such as an integrated circuit (IC), or may be implemented by combination of software and hardware, for example. The imaging unit 120 can be realized by an imager such as a digital camera or a video camera, for example. The acquiring unit 140 is acquired information of the imaging unit 120. The output unit 160 may be realized by a display device such as a liquid crystal display or a touch panel display, or may be realized by a printing device such as a printer, for example.

The control unit 110 controls turning on/off of the light emitting apparatuses A1 to A9 individually via the network 101 by using the identification information of each of the light emitting apparatuses A1 to A9. Specifically, the control unit 110 sends control signals containing on/off commands indicating the timing for turning on and the timing for turning off and the identification information of light emitting apparatuses that are subjects of the on/off commands to the light emitting apparatuses A via the network 101 to thereby control turning on/off of the light emitting apparatuses A.

It is assumed in the first embodiment that the control unit 110 transmits control signals to the light emitting apparatuses A1 to A9 by broadcast. Thus, in the first embodiment, the control signals have the identification information (MAC addresses) of their respective light emitting apparatuses A1 to A9 and on/off commands in association with each other, and are transmitted to all of the light emitting apparatuses A1 to A9.

Upon receipt of the control signals, each of the light emitting apparatuses A1 to A9 checks whether or not its own identification information is contained in the received control signals and, if its own identification information is contained, is turned on or off according to the on/off command associated with its own identification information.

Figure 3:
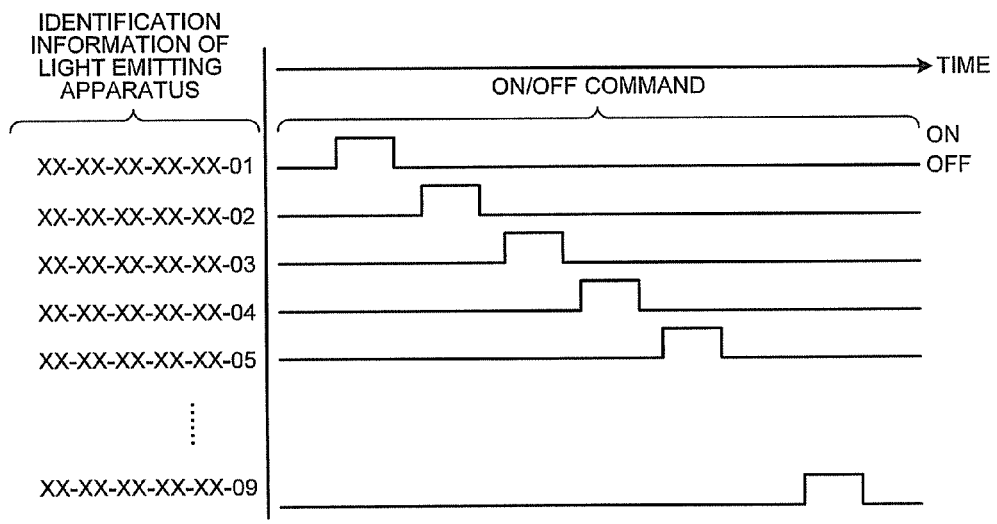
FIG. 3 is a chart illustrating an example of control signals according to the first embodiment.

FIG. 3 is a chart illustrating an example of control signals according to the first embodiment, in which the identification information of each of the light emitting apparatuses A1 to A9 is associated with an on/off command. In the example illustrated in FIG. 3, an ON period of an on/off command indicates bringing a light emitting apparatus A into the ON state and an OFF period of an on/off command indicates bringing a light emitting apparatus A into the OFF state.

Note that, since the identifying unit 130, which will be described later, performs identification by means of change timing at which the ON/OFF state of each of the light emitting apparatuses A1 to A9 changes, the on/off commands are set so that the change timing for changing the on/off state is different for each of the light emitting apparatuses A1 to A9 in the control signals illustrated in FIG. 3. The change timing is either timing for changing from the ON state to the OFF state or timing for changing from the OFF state to the ON state.

It is not necessary, however, to set both of the timing for changing from the ON state to the OFF state and the timing for changing from the OFF state to the ON state to be different for each of the light emitting apparatuses A1 to A9 but it is only needed to set at least one of the timings to be different for each of the light emitting apparatuses A1 to A9.

Thus, the on/off commands may be any commands allowing turning on/off of the light emitting apparatuses A1 to A9 to be controlled by the control unit 110 so that the change timing is different for each of the light emitting apparatuses A1 to A9.

Figure 4:
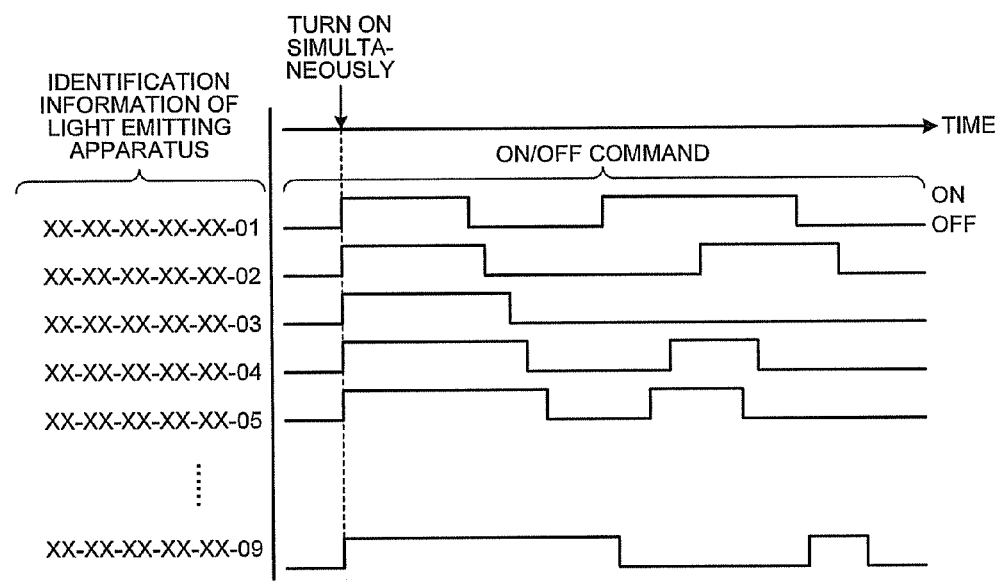
FIG. 4 is a chart illustrating another example of control signals according to the first embodiment.

FIG. 4 is a chart illustrating another example of the control signals according to the first embodiment. In the control signals illustrated in FIG. 4, on/off commands are set so that at least the timing for changing from the ON state to the OFF state is different for each of the light emitting apparatuses A1 to A9.

Note that the on/off commands may be set so that the light emitting apparatuses A1 to A9 will not be in the ON state at the same time as one another like the control signals illustrated in FIG. 3 or may be set so that at least some of the light emitting apparatuses A1 to A9 will be in the ON state at the same time like the control signals illustrated in FIG. 4. Furthermore, contrary to the control signals illustrated in FIG. 3, the on/off commands may be set so that the light emitting apparatuses A1 to A9 will not be in the OFF state at the same time as one another.

Note that the control signals illustrated in FIGS. 3 and 4 are exemplary only, and the control unit 110 can employ various on/off controls as long as the controls can be used for identification performed by the identifying unit 130, which will be described later.

The control unit 110 may alternatively transmit control signals to the light emitting apparatuses A1 to A9 by unicast or multicast. For example, when control signals are transmitted by unicast, it is only needed to prepare a control signal containing the identification information of a light emitting apparatus A and an on/off command in association with each other for each of the light emitting apparatuses A1 to A9 and to transmit the control signals to the respective corresponding light emitting apparatuses A1 to A9 by the control unit 110. In this case, IP addresses are preferably used for the identification information rather than MAC addresses.

The imaging unit 120 captures the space 1 in which the light emitting apparatuses A1 to A9 are installed in time series to obtain time-series captured images. Specifically, the imaging unit 120 captures the light emitting apparatuses A1 to A9 that are individually turned on/off according to the control of the control unit 110 in time series.

Note that the imaging unit 120 includes an image sensor capable of observing light emitted by the light emitting apparatuses A1 to A9 so as to capture the light. The captured images may be grayscale images or color images.

The identifying unit 130 determines the position in which each of the light emitting apparatuses A1 to A9 is installed by using the control on turning on/off of the light emitting apparatuses A1 to A9 performed by the control unit 110 and the time-series captured images captured by the imaging unit 120, and identifies each of light emitting apparatuses A1 to A9 determined by a plurality of installation positions with the light emitting apparatuses A1 to A9 identified by a plurality of pieces of identification information, respectively. Note that the identifying unit 130 identifies the light emitting apparatuses A1 to A9 determined by a plurality of installation positions with the light emitting apparatuses A1 to A9 identified by a plurality of pieces of identification information, respectively, by associating the installation positions of the light emitting apparatuses A1 to A9 with the pieces of identification information of the light emitting apparatuses A1 to A9, respectively.

Specifically, the identifying unit 130 detects, for each light emitting apparatus A, a change region that is a region that changes with turning on/off of the light emitting apparatus A from captured images captured before and after the change timing of the light emitting apparatus A among the time-series captured images, and determines the installation position of the light emitting apparatus A on the basis of the detected change region. More specifically, the identifying unit 130 acquires position/posture information indicating the position and the posture of the imaging unit 120, calculates a spatial position in the space 1 occupied by the change region by using the acquired position/posture information, and determines the calculated spatial position as the installation position of the light emitting apparatus A.

The position information of the imaging unit 120 is information indicating in what position in the space 1 (three-dimensional space) the imaging unit 120 is and can be expressed by coordinates (x, y, z) in a rectangular coordinate system, for example. The position information, however, is not limited thereto and may alternatively be expressed using an oblique coordinate system or a polar coordinate system. The position information of the imaging unit 120 may be a value input by the user via an input device, which is not illustrated, such as a mouse or a key board, or may be a sensor value obtained from a position sensor if the imaging unit 120 includes such a position sensor.

The posture information of the imaging unit 120 is information indicating by what amount the imaging unit 120 has turned from a reference posture and may be expressed by three angles of roll, pitch, and yaw, by Euler angles, by a quaternion, or Rodrigues parameters. The reference posture may be set to any posture, and may be a posture in which an image sensor surface of the imaging unit 120 is parallel to the vertical direction and the optical axis of the imaging unit 120 extends toward the north, for example. The posture information of the imaging unit 120 may be a sensor value obtained from a posture sensor such as a gyro sensor or a magnetic field sensor included in the imaging unit 120, for example.

For example, the identifying unit 130 obtains the pieces of identification information and the on/off commands of the respective light emitting apparatuses A1 to A9 used by the control unit 110 for on/off control of the light emitting apparatuses A1 to A9 from the control unit 110, and determines time t0 of change timing at which the on/off state of the light emitting apparatus A1 changes that is different from timings when the other light emitting apparatuses A2 to A9 change.

The identifying unit 130 then obtains a captured image (t0−pt1) at time t0−pt1 and a captured image (t0+pt2) at time t0+pt2 from the time-series captured images, calculates a difference in pixels between the captured image (t0−pt1) and the captured image (t0+pt2), and detects a region where the difference in pixels exceeds a predetermined threshold as a change region.

Note that pt1 and pt2 are predetermined positive numbers, and more particularly, positive numbers determined so that the on/off state of the light emitting apparatus A2 is different between time t0−pt1 and time t0+pt2. It is thus preferable that pt1<pt2 be satisfied.

Since the light emitting apparatus A1 should be the only light emitting apparatus whose on/off state changes at time t0, the number Mt0 of detected change regions is expected to be one.

Thus, if Mt0=1, the identifying unit 130 determines that the light emitting apparatus A1 is in the detected change region and associates the position of the detected change region with the identification information of the light emitting apparatus A1. The position of a change region only needs to be two-dimensional coordinates representing the change region, and may be coordinates of the center of gravity of the change region or weighted average coordinates of the change region.

If Mt0>1, the identifying unit 130 determines that the detected change regions include a change region in which the light emitting apparatus A1 is not present and do not perform association with the identification information of the light emitting apparatus A1. For example, Mt0>1 may be a case in which light from outside enters the space 1.

If Mt0=0, the identifying unit 130 determines that the change region in which the light emitting apparatus A1 is present cannot be detected and do not perform association with the identification information of the light emitting apparatus A1.

If the association of the identification information of the light emitting apparatus A1 with the position of a change region is not performed, the identifying unit 130 may repeat the same processing as above for another change timing (change timing other than time t0) at which the on/off state of the light emitting apparatus A1 changes that is different from timings when the other light emitting apparatuses A2 to A9 change.

Subsequently, the same processing as above is repeated for each of the light emitting apparatuses A2 to A9 to associate the identification information of each of the light emitting apparatuses A1 to A9 with a change region.

While an example in which a change region is detected for each light emitting apparatus A is described in the first embodiment, a change region of a light emitting apparatus A may be detected at each change timing at which the on/off state of any one of the light emitting apparatuses A1 to A9 changes. In this case, since change regions may be detected a plurality of times for one light emitting apparatus A, Mtx==1 (x≥0) will be satisfied at least in detection at certain time and it is expected that a change region can be associated with the light emitting apparatus A with high probability.

Thereafter, the identifying unit 130 converts the position of a change region associated with the identification information of each of the light emitting apparatuses A1 to A9 into a spatial position in the space 1 (calculates the spatial position) by using the position/posture information of the imaging unit 120. In other words, the identifying unit 130 converts the position of a change region expressed by two-dimensional coordinates into a spatial position expressed by three-dimensional coordinates of the coordinate system of the imaging unit.

As a result, the pieces of identification information of the light emitting apparatuses A1 to A9 are associated with the installation positions of the light emitting apparatuses A1 to A9, respectively, and the light emitting apparatuses A1 to A9 identified by the identification information and the light emitting apparatuses A1 to A9 determined by the installation positions are identified with each other.

The identifying unit 130 performs conversion into spatial positions by utilizing the fact that the light emitting apparatuses A1 to A9 are installed on the ceiling 2 that is substantially planar and using, for example, the technology disclosed in "Extraction of Planar Region and Obstacle Detection Using Stereo Images," IPSJ Transactions on Computer Vision and Image Media, Vol. 45, 2004.

In this case, the posture information of the imaging unit 120, the distance d from the imaging unit 120 to the ceiling 2, and internal parameters of the imaging unit 120 will be required. The position/posture information acquired from the imaging unit 120 can be used as the posture information of the imaging unit 120. The distance d can be obtained by subtracting the height from the floor to the imaging unit 120 from the height h from the floor to the ceiling 2. The height h from the floor to the ceiling 2 may be stored in advance in a storage unit or the like that is not illustrated. As the height to the imaging unit 120, the position information of the imaging unit 120, that is, the position/posture information acquired from the imaging unit 120 or a sensor value measured by a distance sensor or the like may be used. Alternatively, the distance d may be obtained by using the three-dimensional shape of the space 1 obtained by applying three-dimensional reconstruction technique. The internal parameters of the imaging unit 120 may be obtained from the imaging unit 120. Calibration of the internal parameters may be performed by using a commonly known technique.

The mapping unit 150 obtains drawing data of the space 1 and performs mapping by associating the installation positions and the pieces of identification information of the respective identified light emitting apparatuses A1 to A9 on the obtained drawing data. The drawing data may be any data of a drawing indicating the layout in the space 1, such as drawing data of a plan view of the space 1 or drawing data of a layout drawing. The drawing data may be stored in advance in a storage unit or the like that is not illustrated.

The mapping unit 150, however, makes the coordinate system of the drawing data and the coordinate system of the imaging unit 120 correspond to each other before mapping the installation positions and the pieces of identification information of the respective identified light emitting apparatuses A1 to A9 on the drawing data.

When a position coordinate in the coordinate system of the imaging unit 120 is p and a position coordinate in the coordinate system on the drawing data corresponding to the position coordinate p is q, a conversion formula $q=Rp+t$ is satisfied by using an appropriate rotation matrix R and a translation vector t. The mapping unit 150 makes the coordinate system on the drawing data and that of the imaging unit 120 correspond to each other by using this conversion formula.

If the rotation matrix R and the translation vector t cannot be set directly, the mapping unit 150 can use the following technique to make the coordinate system on the drawing data and that of the imaging unit 120 correspond to each other.

First, the mapping unit 150 sets a global coordinate system as a reference. The global coordinate system can be arbitrarily set, and may have an x-axis in the east direction, a y-axis in the north direction and a z-axis in the vertical direction, for example.

Subsequently, since the coordinate system of the imaging unit 120 can be converted into the global coordinate system, a rotation matrix and a translation vector used for the conversion from the coordinate system of the imaging unit 120 into the global coordinate system are represented by Rg and tg, respectively. If the coordinate system of the imaging unit 120 and the global coordinate system are the same coordinate system, the rotation matrix Rg is a unit matrix and the translation vector tg is a zero vector.

Furthermore, since the global coordinate system can be converted into the coordinate system on the drawing data, a rotation matrix and a translation vector used for the conversion from the global coordinate system into the coordinate system on the drawing data are represented by Rd and td, respectively.

When conversion from the position coordinate p in the coordinate system of the imaging unit 120 into the position coordinate q in the coordinate system on the drawing data via the global coordinate system is considered, a conversion formula $q=Rd(Rgp+tg)+td=RdRgp+Rdtg+td$ is satisfied.

Thus, the mapping unit 150 can make the coordinate system on the drawing data and that of the imaging unit 120 correspond to each other by using a rotation matrix $R=RdRg$ and a translation vector $t=Rdtg+td$.

FIG. 5 is a view illustrating an example of a mapping result according to the first embodiment. In the example illustrated in FIG. 5, elements B1 to B9 representing the light emitting apparatuses A1 to A9, respectively, are mapped on the installation positions of the light emitting apparatuses A1 to A9 on the drawing data 151 that is a plan view, and at the same time, the identification information (XX-XX-XX-XX-XX-01) of the light emitting apparatus A1 is mapped in the vicinity of the element B1 and the identification information (XX-XX-XX-XX-XX-02) of the light emitting apparatus A2 is mapped in the vicinity of the element B2. In FIG. 5, mapping of the identification information of the light emitting apparatuses A3 to A9 is not illustrated.

The output unit 160 outputs the drawing data in which the installation positions and the pieces of identification information of the respective identified light emitting apparatuses A1 to A9 are mapped by the mapping unit 150.

FIG. 6 is a flowchart illustrating an example of a flow of procedures of the identification process performed by the identification device 100 according to the first embodiment.

First, the control unit 110 starts on/off control of a plurality of light emitting apparatuses A1 to A9 via the network 101 according to control signal (step S101).

Subsequently, the imaging unit 120 captures the space 1 in which the light emitting apparatuses A1 to A9 are installed in time series to obtain time-series captured images (step S103). As a result, the time-series captured images obtained by capturing in time series the light emitting apparatuses A1 to A9 that are individually turned on/off according to control of the control unit 110 are obtained.

Subsequently, the identifying unit 130 acquires the position/posture information of the imaging unit 120 (step S105).

Subsequently, the identifying unit 130 detects, for each light emitting apparatus A, a change region from captured images captured before and after change timing of the light emitting apparatus A by using the control of turning on/off the light emitting apparatuses A1 to A9 by the control unit 110 and the time-series captured images captured by the imaging unit 120 (step S107), and associates the position of the detected change region with the identification information of the light emitting apparatus A.

Subsequently, the identifying unit 130 calculates, for each light emitting apparatus A, a spatial position in the space 1 occupied by the change region associated with the identification information of the light emitting apparatus A by using the acquired position/posture information, and determines the calculated spatial position as the installation position of the light emitting apparatus A (step S109).

As a result, the pieces of identification information of the light emitting apparatuses A1 to A9 are associated with the installation positions of the light emitting apparatuses A1 to A9, respectively, and the light emitting apparatuses A1 to A9 identified by the identification information and the light emitting apparatuses A1 to A9 determined by the installation positions are identified with each other.

Subsequently, the mapping unit 150 obtains drawing data of the space 1 and performs mapping by associating the installation positions and the pieces of identification information of the respective identified light emitting apparatuses A1 to A9 on the obtained drawing data (step S111).

Subsequently, the output unit 160 outputs the drawing data in which the installation positions and the pieces of identification information of the respective identified light emitting apparatuses A1 to A9 are mapped by the mapping unit 150 (step S113).

As described above, in the first embodiment, a plurality of light emitting apparatuses is individually turned on/off by using respective pieces of identification information of the light emitting apparatuses, a change region that changes with the turning on/off is detected for each light emitting apparatus by using time-series captured images obtained by capturing in time series the light emitting apparatuses that are individually turned on/off, an installation position is determined on the basis of the detected change region, and the light emitting apparatuses identified by the pieces of identification information and the light emitting apparatuses determined by the installation positions are respectively identified with each other. Thus, according to the first embodiment, it is possible to identify a light emitting apparatus determined by an installation position and a light emitting apparatus identified by identification information with each other by a simple operation, and to shorten the time required for the identification operation.

Furthermore, according to the first embodiment, since installation positions and identification information of respective identified light emitting apparatuses are mapped on drawing data indicating the layout of a space and the drawing data resulting from the mapping is output, the user can easily see the association between the installation position and the identification information of each light emitting apparatus.

Second Embodiment

In a second embodiment, description will be made on an example in which a plurality of light emitting apparatuses is identified by performing the identification process described in the first embodiment N times (N>1) separately in such a case in which the light emitting apparatuses installed in a space such as a large office space cannot be captured at a time. In the following, the difference from the first embodiment will be mainly described and components having similar functions as in the first embodiment will be designated by the same names and reference numerals as in the first embodiment, and the description thereof will not be repeated.

FIG. 7 is a diagram illustrating an example of a configuration of an identification device 200 according to the second embodiment. As illustrated in FIG. 7, the identification device 200 of the second embodiment differs from that of the first embodiment in a control unit 210. Furthermore, the identification device 200 (control unit 210) of the second embodiment is connected with a plurality of light emitting apparatuses A1 to A29 via the network 101.

The control unit 210 has an identification mode (an example of a first mode) and a presentation mode (an example of a second mode). The control unit 210 controls turning on/off of the light emitting apparatuses A1 to A29 so that the change timing is different for each of the light emitting apparatus A1 to A29 in the identification mode, and controls turning on/off of the light emitting apparatuses A1 to A29 so that turning on/off of an identified light emitting apparatus A and turning on/off of an unidentified light emitting apparatus A among the light emitting apparatuses A1 to A29 are performed at different times in the presentation mode.

As a result of turning on/off of the light emitting apparatuses A1 to A29 in the presentation mode, the user (the person taking images) can see identified light emitting apparatuses A and unidentified light emitting apparatuses, which allows the identification operation of the light emitting apparatuses A1 to A29 to be performed efficiently.

Thus, the determination of the identification mode or the presentation mode is preferably made in such a manner that the user inputs a mode via an input device that is not illustrated and the control unit 210 determines the mode to be the input mode. In this case, the output unit 160 may be made to output the number of unidentified light emitting apparatus A as reference information for the user to determine the mode. Since the probability that unidentified light emitting apparatuses A are captured is lower in the capturing by the imaging unit 120 at a certain position as the number of unidentified light emitting apparatuses A is smaller, such reference information is useful for increasing the probability of capturing unidentified light emitting apparatuses A.

Note that the method for determining the mode is not limited thereto, and the control unit 210 may determine the mode according to a predetermined rule. For example, the control unit 210 may be in the identification mode and the presentation mode alternately. In other words, the control unit 210 may enter the presentation mode after the identification process is performed once in the identification mode so that the user can see identified light emitting apparatuses A and unidentified light emitting apparatuses A. Alternatively, for example, the control unit 210 may enter the presentation mode after the identification process is performed a certain number of successive times in the identification mode so that the user can see identified light emitting apparatuses A and unidentified light emitting apparatuses A.

In the presentation mode, the control unit 210 first obtains at least one of a list (hereinafter referred to as an identified list) of pieces of identification information of identified light emitting apparatuses A and a list (hereinafter referred to as an unidentified list) of pieces of identification information of unidentified light emitting apparatuses A among the light emitting apparatuses A1 to A29. For example, the control unit 210 can obtain at least one of the identified list and the unidentified list by referring to a light emitting apparatus list that is a list of the pieces of identification information of the light emitting apparatuses A1 to A29 and association information associating the installation positions and the pieces of identification information of identified light emitting apparatuses A among the light emitting apparatuses A1 to A29. The light emitting apparatus list may be stored in advance in a storage unit or the like that is not illustrated. The result of identification by the identifying unit 130 may be used for the association information. A light emitting apparatus A whose on/off state has not changed, however, is not associated in the first place and is therefore naturally unassociated, and the user can easily see that the light emitting apparatus A is unidentified without performing turning on/off in the presentation mode. Thus, the identification information of light emitting apparatuses A whose on/off state has not changed may be deleted from the unidentified list.

The control unit 210 then presents the unidentified light emitting apparatuses A to the user by controlling turning on/off of the light emitting apparatuses A1 to A29 via the network 101 according to at least one of the identified list and the unidentified list. For example, the control unit 210 turns on all the unidentified light emitting apparatuses A and turns off all the identified light emitting apparatuses A or turns off all the unidentified light emitting apparatuses A and turns on all the identified light emitting apparatuses A according to at least one of the identified list and the unidentified list. Alternatively, for example, the control unit 210 may turn off all the identified light emitting apparatuses A and sequentially turn on all the unidentified light emitting apparatuses A or make all the unidentified light emitting apparatuses A blink according to at least one of the identified list and the unidentified list. Still alternatively, for example, the control unit 210 may perform the on/off control described above assuming pieces of identification information specified by the user out of the unidentified list to be the unidentified list and present the unidentified light emitting apparatuses to the user.

These on/off controls, however, are exemplary only, and the control unit 210 can employ various on/off controls as long as the user can see unidentified light emitting apparatuses A.

The user that has seen the presentation result makes the control unit 210 group light emitting apparatuses A whose installation positions are close to one another and hold the pieces of identification information of the grouped light emitting apparatuses A as a close light emitting apparatus list so that the control unit 210 may use the close light emitting apparatus list for the on/off control of the light emitting apparatuses A1 to A29 in the identification mode.

In the identification mode, the control unit 210 performs the on/off control described in the first embodiment on unidentified light emitting apparatus A without performing the on/off control on identified light emitting apparatuses A among the light emitting apparatuses A1 to A29. Thus, in the identification mode, the control unit 210 performs the on/off control described above N times.

When the control unit 210 holds the close light emitting apparatus list, the control unit 210 may perform the on/off control on the light emitting apparatuses A determined by the close light emitting apparatus list among the light emitting apparatuses A1 to A29 without performing the on/off control on the other light emitting apparatuses A. In this manner, since light emitting apparatuses that are at positions close to one another are turned on/off, the imaging unit 120 can capture a number of light emitting apparatuses A that are turned on/off at a time, which can reduce the number of times of capturing (the number of identification processes) and contribute to shortening the time for the identification operation.

The imaging unit 120 performs the capturing described in the first embodiment N times separately. The imaging unit 120, however, performs the capturing each time at a different position.

The identifying unit 130 performs the identification described in the first embodiment for each of the N times of capturing performed by the imaging unit 120. Note that, at the second or subsequent time of the capturing by the imaging unit 120, since the identifying unit 130 already have the position/posture information of the imaging unit 120 at previous capturing, the identifying unit 130 may obtain the current position/posture information of the imaging unit 120 by estimating a change amount from the previous position/posture information of the imaging unit 120. The estimation of a change amount can be realized by using a technology such as SLAM (simultaneous localization and mapping) and dead reckoning. Even at the second or subsequent time of capturing by the imaging unit 120, however, the position/posture information may be acquired from the imaging unit 120 similarly to the first embodiment. Furthermore, at the second or subsequent time of capturing by the imaging unit 120, the identifying unit 130 adds a result of association (association information) between the identification information and the installation position of each identified light emitting apparatus A obtained this time to the result of association obtained so far.

The mapping unit 150 performs the mapping described in the first embodiment for each of the N times of capturing performed by the imaging unit 120. The mapping unit 150, however, may perform the mapping once after N times of capturing are completed instead of performing the mapping for each of the N times of capturing by the imaging unit 120.

FIG. 8 is a view illustrating an example of a mapping result according to the second embodiment. In the example illustrated in FIG. 8, elements B1 to B29 representing the light emitting apparatuses A1 to A29, respectively, are mapped on the installation positions of the light emitting apparatuses A1 to A29 on drawing data that is a plan view, and at the same time, the identification information (XX-XX-XX-XX-XX-01) of the light emitting apparatus A1 is mapped in the vicinity of the element B1. In FIG. 8, mapping of the identification information of the light emitting apparatuses A2 to A29 is not illustrated.

In the example illustrated in FIG. 8, five times of capturing (identification process) are performed to identify the light emitting apparatuses A1 to A29. Specifically, the first capturing (identification process) by the imaging unit 120 is performed at a position C1, the second capturing by the imaging unit 120 is performed at a position C2, the third capturing by the imaging unit 120 is performed at a position C3, the fourth capturing by the imaging unit 120 is performed at a position C4, and the fifth capturing by the imaging unit 120 is performed at a position C5.

FIG. 9 is a flowchart illustrating an example of a flow of procedures of the identification process performed by the identification device 200 according to the second embodiment.

First, the control unit 210 checks whether or not the mode is the presentation mode (step S201).

If the mode is the presentation mode (Yes in step S201), the control unit 210 acquires association information and a light emitting apparatus list (step S203), obtains at least one of an identified list and an unidentified list from the association information and the light emitting apparatus list, and controls turning on/off of the light emitting apparatuses A1 to A29 so that turning on/off of the identified light emitting apparatuses A and turning on/off of the unidentified light emitting apparatuses A among the light emitting apparatuses A1 to A29 will be different from each other according to at least one of the identified list and the unidentified list (step S205). The process then returns to step S201.

If, on the other hand, the mode is not the presentation mode in step S201 (No in step S201), that is, if the mode is the identification mode, the processing in steps S207 to S217 is performed, which is the same as the processing in steps S101 to S111, respectively, in the flowchart illustrated in FIG. 6 expect for the difference described above.

Subsequently, in step S219, the control unit 210 updates the unidentified list, and determines to continue the process (Yes in step S219) is identification information is still contained in the updated unidentified list, for example, and the process returns to step S201.

If, on the other hand, no identification information is contained in the updated unidentified list, the control unit 210 determines to terminate the process (No in step S219), the output unit 160 outputs drawing data in which the installation positions and the pieces of identification information of the respective identified light emitting apparatuses A1 to A29 are mapped by the mapping unit 150 (step S221), and the process is then terminated.

As described above, according to the second embodiment, it is possible to identify a light emitting apparatus determined by an installation position and a light emitting apparatus identified by identification information with each other by a simple operation and to shorten the time required for the identification operation similarly to the first embodiment even in the case of light a plurality of emitting apparatuses installed in such a large space that the light emitting apparatuses cannot be captured at a time.

Furthermore, since the presentation mode is employed in the second embodiment, even when capturing (identification process) is performed a plurality of times, the user can see unidentified light emitting apparatuses and the number of times of the capturing (identification process) can be expected to be reduced, which can shorten the time required for the identification operation.

MODIFIED EXAMPLE 1

In the embodiments described above, the imaging unit 120 may adjust the exposure, the white balance, and the like in advance so that the change in the change region caused by the change in the on/off state of a light emitting apparatus A will be more noticeable.

MODIFIED EXAMPLE 2

In the embodiments described above, the identifying unit 130 may limit the regions to be detected to part of captured images in the process of detecting a change region. Specifically, the identifying unit 130 may calculate an existence region in which a plurality of light emitting apparatuses is present in captured images captured before and after change timing by using the position/posture information, and detects a change region within the calculated existence region. For example, when a plurality of light emitting apparatuses is installed on the ceiling as in the embodiments described above, the existence region will be the ceiling surface. Thus, the identifying unit 130 only needs to calculate the ceiling surface as the existence region in the captured images captured before and after the change timing by using the position/posture information.

In this manner, it is not necessary to perform detection of a change region outside of the existence region, it is possible to reduce false detection, and the process of detecting a change region is expected to increase in speed and accuracy.

MODIFIED EXAMPLE 3

In the embodiments described above, the identifying unit 130 may delete less reliable association from the result of association between the pieces of identification information of the respective light emitting apparatuses and the installation positions of the respective light emitting apparatuses and may make the output unit 160 inform of the less reliable association. For example, in a case where a plurality of installation positions is associated with one piece of identification information or in a case where a plurality of pieces of identification information is associated with one installation position, the identifying unit 130 deletes or inform of such association. If the user is informed of such association, the user can perform the identification process again for the installation position of which the user is informed and verify less reliable association again.

MODIFIED EXAMPLE 4

In the first embodiment described above, when an unidentified light emitting apparatus is present, the identifying unit 130 may make the output unit 160 inform of the unidentified light emitting apparatus. For example, the output unit 160 may output a list of pieces of identification information of unidentified light emitting apparatuses. Alternatively, for example, the presentation mode described in the second embodiment may be employed, and the informing may be performed by turning on or off the unidentified light emitting apparatuses or making the unidentified light emitting apparatuses blink. As a result, the user can see the unidentified light emitting apparatuses and quickly perform the identification again.

MODIFIED EXAMPLE 5

In the embodiments described above, the identifying unit 130 may acquire shape information indicating the shape and the size of each of a plurality of light emitting apparatuses in advance, and calculate the reliability of a result of association between the identification information and the installation position of a light emitting apparatus by comparing the shape information with the shape and the size of a detected change region. If the reliability is lower than a predetermined threshold, the identifying unit 130 may then delete the association from the association result or make the output unit 160 inform that the reliability of the association is low or that capturing by the imaging unit 120 is blurred. As a result, the user can perform the identification process again for the installation position of which the user is informed and verify less reliable association again. The blurring in capturing by the imaging unit 120 can be detected by using the position/posture information of the imaging unit 120.

MODIFIED EXAMPLE 6

When pieces of identification information and installation positions of a plurality of light emitting apparatuses are associated with one another by the identification technique described in the embodiments or other techniques, an ID and an installation position of an imaging apparatus positioned to capture an illumination range of a light emitting apparatus can be automatically associated.

Note that the imaging apparatus is an apparatus including capturing means such as a surveillance camera, and may be any apparatus having capturing means such as an air conditional with a camera or a motion sensor with a camera.

Specifically, on/off control of the light emitting apparatuses is performed similarly to the identification technique described in the embodiments above, and the imaging apparatus performs capturing. The brightness of captured images captured by the imaging apparatus varies with the change in the on/off state of the light emitting apparatuses, and this variation in the brightness is maximum when the on/off state of a light emitting apparatus that is nearest to the capturing region of the imaging apparatus changes. Thus, the position of the light emitting apparatus whose on/off state has changed when the variation in the captured images is maximum is associated as the position of the capturing region of the imaging apparatus with the ID of the imaging apparatus.

As a result, it is possible to automatically associate the ID and the capturing region of the imaging apparatus, which can reduce the trouble of association.

Hardware Configuration

An example of a hardware configuration of an identification device according to the embodiments and the modified examples described above will be described. The identification device according to the embodiments and the modified examples described above includes a control device such as a CPU, a storage device such as a ROM and a RAM, an external storage device such as an HDD, a display device such as a display, an input device such as a keyboard and a mouse, and a communication device such as a communication interface, which is a hardware configuration utilizing a common computer system.

Programs to be executed by the identification device according to the embodiments and the modified examples described above are recorded on a computer readable recording medium such as a CD-ROM, a CD-R, a memory card, a digital versatile disk (DVD) and a flexible disk (FD) in a form of a file that can be installed or executed, and provided therefrom.

Alternatively, the programs to be executed by the identification device according to the embodiments and the modified examples may be stored on a computer system connected to a network such as the Internet, and provided by being downloaded via the network. Still alternatively, the programs to be executed by the identification device according to the embodiments and the modified examples may be provided or distributed through a network such as the Internet. Still alternatively, the programs to be executed by the identification device according to the embodiments and the modified examples may be embedded in a ROM or the like in advance and provided therefrom.

The programs to be executed by the identification device according to the embodiments and the modified examples have modular structures for implementing the units described above on a computer system. In an actual hardware configuration, the CPU reads programs from the HDD and executes the programs on the RAM, whereby the respective units described above are implemented on a computer system.

For example, the order in which the steps in the flowcharts in the embodiments described above are performed may be changed, a plurality of steps may be performed at the same time or the order in which the steps are performed may be changed each time the steps are performed.

As described above, according to the embodiments and the modified examples, it is possible to identify a light emitting apparatus determined by an installation position and a light emitting apparatus identified by identification information with each other by simple operation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An identification device comprising:
a hardware processor configured to execute following elements:
a controller configured to control turning on/off of a plurality of light emitting apparatuses installed in a space via a network individually by using pieces of identification information of their respective light emitting apparatuses; and
an identifying unit configured to determine an installation position of each of the light emitting apparatuses by using the on/off control on the light emitting apparatuses, images capturing the space in time series by an imaging unit, and position/posture information indicative of a position and a posture of the imaging unit, and identify each of the light emitting apparatuses determined by the installation position corresponding to each of the light emitting apparatuses identified by the pieces of identification information with each other.

2. The device according to claim 1, wherein the imaging unit is configured to capture the space of setting the light emitting apparatuses.

3. The device according to claim 1, wherein the hardware processor further executes a mapping unit configured to acquire drawing data of the space, and map the installation position and the piece of identification information of each of identified light emitting apparatuses in association with each other on the acquired drawing data.

4. The device according to claim 1, wherein
the imaging unit captures the space in time series N times (N>1) separately,
the identifying unit identifies, for each of the N times of capturing, each of the light emitting apparatuses determined by the installation position and each of the light emitting apparatuses identified by the pieces of identification information with each other, and
the identification device further comprises a mapping unit configured to acquire drawing data of the space, and map, for each of the N times of capturing, the installation position and the piece of identification information of each of identified light emitting apparatuses in association with each other on the acquired drawing data.

5. The device according to claim 3, wherein the hardware processor further executes an output unit configured to output the drawing data in which the installation positions and the pieces of identification information of the identified light emitting apparatuses are mapped.

6. The device according to claim 4, wherein the hardware processor further executes an output unit configured to output the drawing data in which the installation positions and the pieces of identification information of the identified light emitting apparatuses are mapped.

7. The device according to claim 1, wherein the identifying unit identifies each of the light emitting apparatuses determined by the installation position and each of the light emitting apparatuses identified by the pieces of identification information with each other by associating the installation position of each of the light emitting apparatuses and the piece of identification information of each of the light emitting apparatuses with each other.

8. The device according to claim 1, wherein the light emitting apparatuses are lighting equipment.

9. An identification method comprising:
controlling turning on/off of a plurality of light emitting apparatuses installed in a space via a network individually by using pieces of identification information of their respective light emitting apparatuses;

determining an installation position of each of the light emitting apparatuses by using the on/off control on the light emitting apparatuses, images capturing the space in time series by an imaging unit, and position/posture information indicative of a position and a posture of the imaging unit; and identifying each of the light emitting apparatuses determined by the installation position corresponding to each of the light emitting apparatuses identified by the pieces of identification information with each other.

10. A computer program product comprising a computer-readable medium containing a computer program that causes a computer to execute:

controlling turning on/off of a plurality of light emitting apparatuses installed in a space via a network individually by using pieces of identification information of their respective light emitting apparatuses;

determining an installation position of each of the light emitting apparatuses by using the on/off control on the light emitting apparatuses, images capturing the space in time series by an imaging unit, and position/posture information indicative of a position and a posture of the imaging unit; and identifying each of the light emitting apparatuses determined by the installation position corresponding to each of the light emitting apparatuses identified by the pieces of identification information with each other.

11. An identification device comprising:

a hardware processor configured to execute following elements:

a controller configured to control turning on/off of a plurality of light emitting apparatuses installed in a space via a network individually by using pieces of identification information of their respective light emitting apparatuses; and an identifying unit configured to determine an installation position of each of the light emitting apparatuses by using the on/off control on the light emitting apparatuses, images capturing the space in time series by an imaging unit, and position/posture information indicative of a position and a posture of the imaging unit, and identify each of the light emitting apparatuses determined by the installation position corresponding to each of the light emitting apparatuses identified by the pieces of identification information with each other, wherein the controller controls turning on/off of the light emitting apparatuses so that change timing that is at least one of timing for changing from an ON state to an OFF state and timing for changing from the OFF state to the ON state is different for each of the light emitting apparatuses, the identifying unit detects, for each of the light emitting apparatuses, a change region that is a region changing with turning on/off of the light emitting apparatus from the images captured before and after the change timing of the light emitting apparatuses among images the time-series captured, acquires the position/posture information, calculates a spatial position occupied by the change region in the space by using the acquired position/posture information, and determines the calculated spatial position as the installation position of the light emitting apparatus.

12. The device according to claim 11, wherein the identifying unit calculates an existence region in which the light emitting apparatuses are present in the captured images before and after the change timing by using the position/posture information, and detects the change region within the calculated existence region.

13. The device according to claim 11, wherein the controller controls turning on/off of the light emitting apparatuses so that the change timing is different for each of the light emitting apparatuses in a first mode, and controls turning on/off of the light emitting apparatuses so that turning on/off of identified light emitting apparatuses is different from turning on/off of unidentified light emitting apparatuses among the light emitting apparatuses in a second mode.

* * * * *